United States Patent
Kintea et al.

(10) Patent No.: US 12,140,167 B2
(45) Date of Patent: Nov. 12, 2024

(54) ANGLE PIECE FLUIDICALLY CONNECTING FLUID LINES OF A VEHICLE

(71) Applicant: NORMA Germany GmbH, Maintal (DE)

(72) Inventors: Daniel Kintea, Maintal (DE); Hannes Clasen, Maintal (DE); Gerrit von Breitenbach, Maintal (DE); Jean-Luc Kirmann, Maintal (DE); David Schneider, Maintal (DE); Sven Reuter, Maintal (DE)

(73) Assignee: Norma Germany GmbH, Maintal (DE)

( * ) Notice: Subject to any disclaimer, the term of this patent is extended or adjusted under 35 U.S.C. 154(b) by 187 days.

(21) Appl. No.: 17/429,414

(22) PCT Filed: Feb. 5, 2020

(86) PCT No.: PCT/EP2020/052877
§ 371 (c)(1),
(2) Date: Aug. 9, 2021

(87) PCT Pub. No.: WO2020/161190
PCT Pub. Date: Aug. 13, 2020

(65) Prior Publication Data
US 2022/0128072 A1 Apr. 28, 2022

(30) Foreign Application Priority Data
Feb. 8, 2019 (DE) .................... 10 2019 103 210.5

(51) Int. Cl.
*F15D 1/04* (2006.01)
*F16L 43/00* (2006.01)
*F16L 55/027* (2006.01)

(52) U.S. Cl.
CPC ............... *F15D 1/04* (2013.01); *F16L 43/00* (2013.01); *F16L 55/027* (2013.01)

(58) Field of Classification Search
CPC ............ F15D 1/04; F16L 43/00; F16L 55/027
See application file for complete search history.

(56) References Cited

U.S. PATENT DOCUMENTS

| 2,705,973 A | 4/1955 | Kice |
| RE25,153 E | 4/1962 | Speiser |

(Continued)

FOREIGN PATENT DOCUMENTS

| DE | 971995 C | * | 5/1959 |
| DE | 1207163 B | * | 12/1965 |

(Continued)

OTHER PUBLICATIONS

European Office Action for European Application No. 20 705 009.7 dated Nov. 25, 2022 (7 pages).

(Continued)

*Primary Examiner* — Zachary T Dragicevich
*Assistant Examiner* — James A Linford
(74) *Attorney, Agent, or Firm* — REISING ETHINGTON, P.C.

(57) ABSTRACT

An angle piece for fluidically connecting fluid lines of a vehicle. The angle piece has a channel portion for altering a flow direction of a fluid about an alteration angle. An input flow direction of the fluid into the angle piece and an outlet flow direction of the fluid from the angle piece form limbs of the alteration angle. At least one guide element is arranged in the channel portion, which guide element protrudes into the channel portion. The at least one guide element altering the flow direction of a part of the fluid by the alteration angle. The angle piece thus has a low pressure drop.

16 Claims, 5 Drawing Sheets

(56) References Cited

U.S. PATENT DOCUMENTS

| | | | |
|---|---|---|---|
| 4,019,537 | A | 4/1977 | Bonnard et al. |
| 5,658,159 | A | 8/1997 | Gardner et al. |
| 5,814,738 | A | 9/1998 | Pinkerton et al. |
| 8,061,323 | B2 | 11/2011 | Konzelmann et al. |
| 8,733,400 | B2 | 5/2014 | Muggli et al. |
| 2012/0152394 | A1 | 6/2012 | Yoskowitz |
| 2016/0273279 | A1 | 9/2016 | Richards |

FOREIGN PATENT DOCUMENTS

| | | | |
|---|---|---|---|
| DE | 2513113 | A1 | 10/1975 |
| DE | 3726492 | C1 * | 11/1988 |
| DE | 10360839 | B3 | 6/2005 |
| DE | 102007023119 | A1 | 11/2008 |
| EA | 001256 | B1 | 12/2000 |
| FR | 987477 | A * | 8/1951 |
| FR | 1053501 | A * | 2/1954 |
| FR | 2076267 | A5 * | 10/1971 |
| FR | 2110770 | A5 | 6/1972 |
| FR | 2119286 | A6 * | 8/1972 |
| FR | 2426821 | A1 * | 12/1979 |
| GB | 380068 | A * | 9/1932 |
| JP | S54104521 | U | 7/1979 |
| JP | S5872419 | U | 5/1983 |
| JP | H0685905 | U * | 12/1994 |
| KR | 20150043129 | A | 4/2015 |
| RU | 2445997 | C2 | 3/2012 |
| WO | WO2016001364 | A1 | 1/2016 |

OTHER PUBLICATIONS

Russian Office Action for Russian Application No. 2021122859/12(047769) dated May 25, 2022 (4 pages).
Russian Search Report for Russian Application No. 2021122859/12(047769) dated May 25, 2022 (2 pages).
English Translation of Russian Office Action for Russian Application No. 2021122859/12(047769) dated May 25, 2022 (3 pages).
English Translation of Russian Search Report for Russian Application No. 2021122859/12(047769) dated May 25, 2022 (2 pages).
Japanese Office Action for Japanese Application No. 2021-545489 dated Jul. 26, 2022 (4 pages).
English Translation of Japanese Office Action for Japanese Application No. 2021-545489 dated Jul. 26, 2022 (6 pages).
Chinese Office Action for Chinese Application No. 202080029773.6 dated Sep. 15, 2022 (9 pages).
Canadian Office Action for Canadian Application No. 3,124,033 dated Sep. 15, 2022 (4 pages).
International Preliminary Report on Patentability for International Application No. PCT/EP2020/052877 dated Aug. 10, 2021 (7 pages).
Chinese Office Action for Chinese Application No. 202080007761.3 dated Oct. 8, 2022 (10 pages).
German Office Action for German Application No. 10 2019 103 210.5 dated Jul. 18, 2019 (4 pages).
International Search Report for International Application No. PCT/EP2020/052877 dated Apr. 23, 2020 (4 pages).
English Translation of International Search Report for International Application No. PCT/EP2020/052877 dated Apr. 23, 2020 (2 pages).
Korean Office Acton for Korean Application No. 10-2021-7028753 dated Dec. 28, 2023 (14 pages).
English Translation of Korean Office Acton for Korean Application No. 10-2021-7028753 dated Dec. 28, 2023 (5 pages).
European Office Action for European Application No. 20 705 009.7-1012 dated Jul. 10, 2023 (4 pages).

* cited by examiner

ANGLE PIECE FLUIDICALLY CONNECTING FLUID LINES OF A VEHICLE

TECHNICAL FIELD

The disclosure relates to an elbow for fluid-communicating connection of fluid lines of a vehicle.

BACKGROUND

In vehicles, fluids, such as for example oil, fuel or cooling water, are provided by means of fluid lines at various positions in the vehicle. Said lines run in various directions and different structural spaces, with the result that, at some positions, elbows are needed to lead the fluid lines "around the corner". The elbows are, in this case, designed as quick-action connectors for connection of fluid lines and connect two fluid lines to one another at a specific angle, for example 90°. Said elbows may be produced for example by injection-molding processes, in which mold cores form the interior of the elbow, with the elbows having relatively small inner diameters. After the injection-molded material has cured, the mold cores are withdrawn from the elbow. For each leg of the elbow, use is made here of separate mold cores, with the result that a sharp edge is formed between the legs of the elbow. If, instead of the edge, a curve was to be formed, this would provide an undercut for the mold cores, which, during the withdrawal of the mold cores, could lead to damage to the elbow. If a fluid flows over said sharp edge during operation, the abrupt change in direction gives rise to vortices, which can result in a considerable pressure drop. Said pressure drop has an effect on the entire fluid system of the vehicle in which the elbow is installed.

BRIEF SUMMARY OF THE DISCLOSURE

It is therefore an object of at least one embodiment of the disclosure to provide an improved elbow and an improved method for producing an elbow, wherein the improved elbow reduces a pressure drop.

In the case of an elbow for fluid-communicating connection of fluid lines of a vehicle, wherein the elbow has a channel section for changing a flow direction of a fluid by a change angle, wherein an inlet flow direction of the fluid into the elbow and an outlet flow direction of the fluid from the elbow form legs of the change angle, it is provided according to an embodiment of the disclosure that at least one guide element is arranged in the channel section and projects into the channel section, wherein the at least one guide element at least largely changes the flow direction of one part of the fluid by the change angle.

By means of at least some embodiments of the disclosure, an elbow for connecting fluid lines of a vehicle is provided, wherein at least one guide element projecting into the elbow assists the change in the flow direction that is brought about by means of the elbow. The guide element may in this case be a guide wall. Here, the guide element has the effect that one part of the fluid flowing through the elbow and over an edge arranged in the elbow is diverted before said part generates vortices through interaction with further parts of the fluid stream, which vortices lead to a pressure drop in the flow. Without a guide element, this part of the flowing fluid, as well as the remainder of the flowing fluid, would flow as far as a diverting surface of the channel section and only then be diverted. Here, the part of the flowing fluid would cross the path of already diverted parts of the fluid and cause vortices. Here, the guide element diverts the part of the fluid through the change angle before said part generates, with other already diverted parts of the fluid, vortices. Consequently, by means of at least some embodiments of the disclosure, vortices are reduced in elbows for fluid-communicating connection of fluid lines of vehicles.

Furthermore, this results in a pressure drop in the elbow and the fluid line system connected thereto being reduced. Consequently, the vehicle system can save energy since no additional energy has to be used for a pressure increase in the fluid line system.

Furthermore, the elbow may have an inlet section and an outlet section which are connected in fluid communication by means of the channel section, wherein the channel section has an edge which is arranged between the inlet section and the outlet section.

The production of an edge can be realized in a simple manner by means of mold cores since the edge, by contrast to a curve, has no undercuts in relation to the required mold cores.

It may furthermore be provided that the angular space has three guide elements, wherein one of the three guide elements is arranged between the two other guide elements of the three guide elements and, with the two other guide elements of the three guide elements, in each case defines a guide channel.

With three guide elements, three different parts of the flow of the fluid are diverted through the change angle. Only a small part of the flowing fluid flows as far as a diverting surface of the channel section. Crossing of the flows in the elbow is thus avoided further, with the result that the avoidance of vortices is improved. Consequently, it is likewise the case that the avoidance of a pressure drop is improved further.

The change angle may be between 45° and 135°, preferably between 60° and 110°, more preferably 90°.

Furthermore, the at least one guide element may have a section which is similar in shape to an arc and which covers an angle whose magnitude corresponds completely or largely to the change angle. The at least one guide element may also have a connecting section which connects the section similar in shape to an arc to a wall of the channel section, wherein the connecting section has a different shape than the section similar in shape to an arc.

Here, the connecting section may be formed from flat surfaces, while the section similar in shape to an arc is of arcuate form. Here, the flat surfaces may be arranged in such a way that, with production of the guide element in combination with the elbow, the connecting section has no undercuts in relation to at least one mold core which forms the interior of the elbow.

Therefore, after the production of the elbow and of the guide element, the mold core can be pulled out of the elbow without breaking off the guide element, since the connecting section has no undercut in relation to the mold core and the section similar in shape to an arc can be deformed elastically. In this way, the section similar in shape to an arc can compensate for the forces brought about by undercuts. Production of the guide element at the same time as the elbow is thus rendered possible, whereby the production is simplified.

The connecting section may, per at least some embodiments, advantageously have at the inner wall an angled shape with two leg pieces, wherein in each case one leg piece is arranged parallel to one of the legs, wherein, with an increasing distance from an inner wall of the channel section, the connecting section transitions into an arcuate shape.

With production by means of a mold core in the elbow, at the inner wall, no forces act on that part of the connecting section which is arranged on or close to the inner wall that deform the part of the connecting section during the removal of the mold core. As the distance from the inner wall increases, the connecting section of the guide element projecting into the channel section gradually assumes a shape similar to an arc and transitions into the section similar in shape to an arc. Consequently, only away from the inner wall does the connecting section comprises undercuts, which are subjected to forces during the removal of a mold core. The guide element is more flexible away from the inner wall than close to the inner wall and, by way of elastic deformation, can compensate for the forces occurring during the removal of the mold core. Production of the guide element at the same time as the elbow is thus likewise rendered possible, whereby the production is simplified.

Alternatively or additionally, the connecting section may extend in the flow direction along a part of the section similar in shape to an arc and have between the section similar in shape to an arc and the inner wall a cross-sectional surface formed from two part-surfaces, wherein one part-surface of the two part-surfaces is free of an undercut in relation to the inlet flow direction and the other part-surface is free of an undercut in relation to the outlet flow direction.

Consequently, per at least some embodiments, the section similar in shape to an arc is connected to the inner wall not over its entire extent but only via a part of the section similar in shape to an arc. Here, the connecting section connected to the part, which connecting section connects the part to the inner wall, can be formed without undercuts in relation to a mold core used during the production of the interior of the elbow. Damage to the connection of the guide element to the inner wall is thus avoided when removing the mold core during the production of the elbow. Production of the guide element at the same time as the elbow is thus likewise rendered possible, whereby the production is simplified.

Furthermore, alternatively or additionally, the inner wall may have at least one guide groove for rail elements of a connecting section of a guide element, wherein the guide groove extends parallel to one of the legs, wherein the connecting section has at least one rail element which can be moved slidingly in the guide groove and can be fixed in the guide groove.

In this case, per at least some embodiments, the guide element can be produced separately from the elbow. Here, the guide grooves are, for example, produced in the inner wall of the channel section at a subsequent stage. The rail elements of the guide element can then be introduced slidingly into the guide grooves and moved along the guide groove. By means of the movement of the rail elements along the guide groove, the guide element can be positioned in the channel section. The guide element can be fixed to the inner wall at the intended position by means of the rail elements. The guide element may be produced from a different material than the elbow.

Alternatively or additionally, the connecting section may have a lateral aperture for connecting the guide element to the wall of the channel section.

The lateral aperture may be fastened to or in the inner wall in the channel section at the intended position of the guide element. The guide element may subsequently be plugged into the lateral aperture in a simple manner. In the process, the guide element is fastened by way of the lateral aperture to the inner wall at the intended position.

The guide element may furthermore be fastened to a holding element of a fluid line which is connected to the elbow, wherein the holding element of the fluid line is arranged in the elbow in the channel section.

The guide element is, per at least some embodiments, in this case integrated into the design of the holding element where it is simple to achieve and simple to produce. The pushing-in of the holding element of the fluid line results in the guide element being introduced into the channel section.

The elbow may furthermore have a reinforcement element, preferably a strut, which supports the at least one guide element against the elbow, wherein the reinforcement element extends away from the at least one guide element.

Here, the reinforcement element connects the at least one guide element to a wall of the elbow that is not arranged in the direction of extent of the guide element, in which the guide element projects into the channel section. Consequently, by way of the reinforcement element, the guide element is supported in a direction in which there flows a part of the fluid that is diverted by the guide element. That is to say, the reinforcement element brings about reinforcement of the guide element in the plane in which the change angle is arranged. Structures which are arranged in the channel section generally increase the pressure drop in the fluid, since the cross section of the line is reduced and further vortices are generated. However, surprisingly, the guide element instead brings about a further reduction in the pressure drop in the elbow. Furthermore, due to the reinforcement element, the likelihood of the guide elements breaking is reduced, with the result that the likelihood of the lines clogging or of further components arranged downstream being damaged is reduced too.

Here, the reinforcement element may also extend in this plane spanned by the legs of the change angle to a wall of the elbow or to a wall of a fluid line in the channel section and, if the elbow has multiple guide elements, connect the guide elements to one another.

The reinforcement element thus supports the guide elements with respect to one another. This brings about an improvement, per at least some embodiments, in the stability of the guide elements.

Furthermore, the reinforcement element can support the guide element indirectly, or directly, against the elbow. This brings about a further improvement, per at least some embodiments, in the stability of the guide elements.

Here, the guide elements may be connected at a support ring, which can be inserted into the elbow and connected to the latter. The advantage of the configuration, per at least some embodiments, as a separate component, in particular as a support ring, is that material pairings can be used. The polyamides generally used for elbows are susceptible to hydrolysis. The configuration of the support ring as a separate component makes possible combinations with different materials, which are not susceptible to hydrolysis.

Furthermore, the reinforcement element can extend in a further direction of extent along the main flow direction of the fluid in the elbow.

BRIEF DESCRIPTION OF THE FIGURES

Further features, details and advantages of the disclosure emerge from the wording of the claims and from the following description of exemplary embodiments on the basis of the drawings, in which:

DETAILED DESCRIPTION

The elbow for fluid-communicating connection of fluid lines of a vehicle is denoted below by the reference sign 10.

Figure 1A:
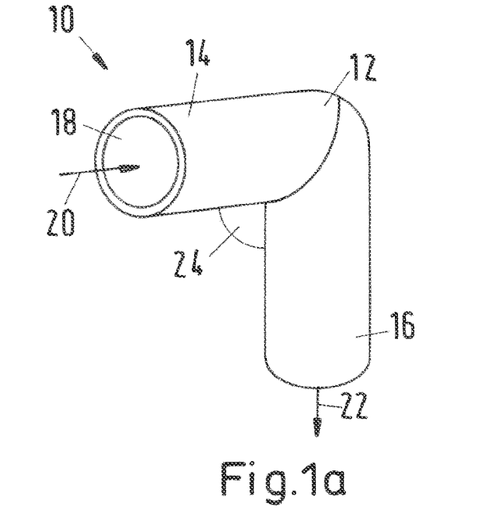
FIG. 1a, b show schematic illustrations of an elbow.

FIG. 1a illustrates the elbow 10. The elbow 10 is designed as a quick-action connector for fluid lines of a vehicle. The connection to fluid lines of a vehicle is realized here at an inlet section 14 and at an outlet section 16 of the elbow 10. A fluid, from the fluid lines connected in fluid communication to the elbow 10, is introduced into the elbow 10 at the inlet section 14 and is guided out of the elbow at the outlet section 16. Here, the fluid has an inlet flow direction 20 at the inlet section 14 and an outlet flow direction 22 at the outlet section 16 of the elbow 10. The inlet flow direction 20 of the fluid and the outlet flow direction 22 of the fluid in this case form legs of a change angle 24, by which change angle the flow of the fluid is changed by the elbow 10. The change in the flow direction is realized here in a channel section 12 of the elbow 10. Here, the change angle 24 may be between 45° and 135°, preferably between 60° and 110°, more preferably 90°.

Figure 1B:
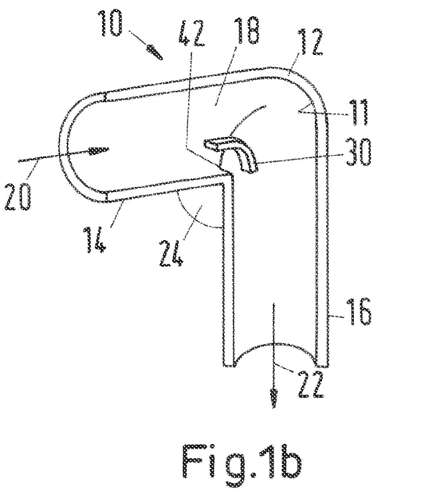

FIG. 1b shows a longitudinal section through the elbow 10. It can be seen here that an edge 42 is arranged between the inlet section 14 and the outlet section 16, said edge connecting the inlet section 14 to the outlet section 16. Here, the edge 42 is arranged in a channel section 12 of the elbow 10. The channel section 12 has a diverting surface 11 which is opposite the edge 42. One part of the flow of the fluid is diverted through the change angle 24 at the diverting surface 11. Another part of the flow of the fluid is diverted through the change angle 24 at a guide element 30, wherein the guide element 30 is arranged in the channel section 12 and projects into the channel section 12.

Figure 2A:
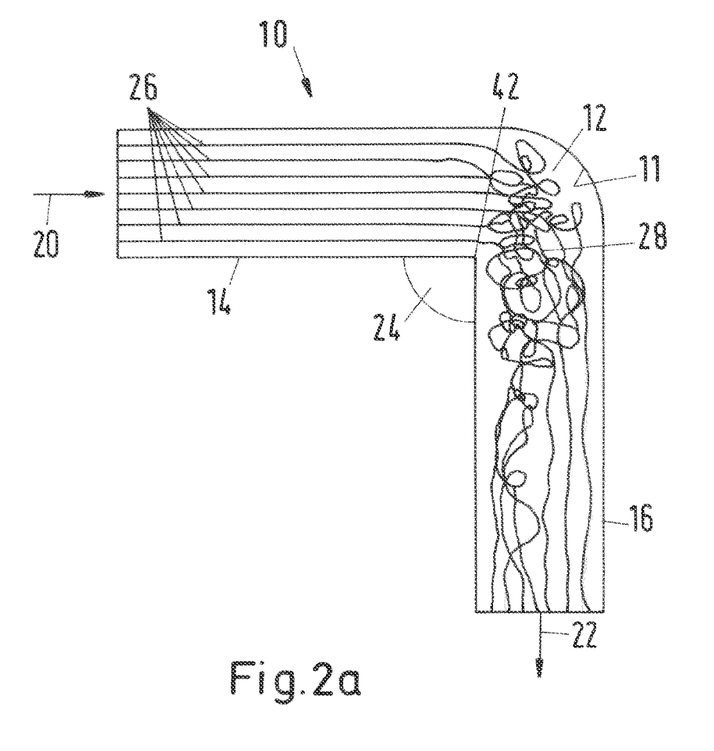
FIGS. 2a-c show schematic cross-sectional illustrations of an elbow with exemplary streamlines.
Figure 2B:
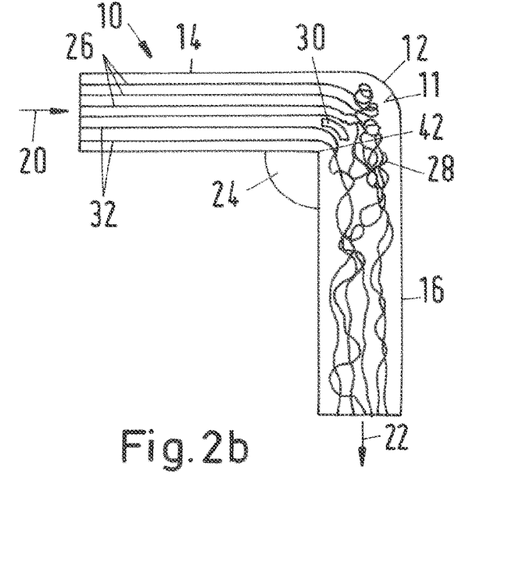
Figure 2C:
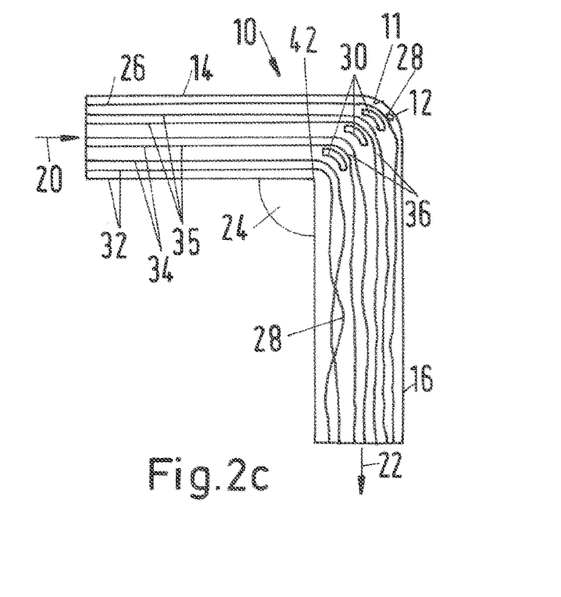

FIGS. 2a to 2c show the flows in elbows 10 having a different number of guide elements 30.

FIG. 2a comprises here an elbow 10 which has no guide element 30. Streamlines 26 of the fluid indicating a flow beginning in the inlet flow direction 20 are drawn within the elbow 10. In the inlet section 14, the flow is undisturbed and exhibits no turbulence or swirling. The flow flows over the edge 42 into the channel section 12, wherein, at the edge 42, boundary-layer separation occurs and a large dead-water zone is formed. In this case, there are formed vortices 28, which propagate as far as the outlet section 16 of the elbow 10. The vortices result in a pressure drop in the elbow 10, which extends further through the downstream fluid lines of the vehicle.

FIG. 2b shows an elbow 10 which has one guide element 30. One part 32 of the flow of the fluid is diverted by the guide element 30 from the inlet section 14 into the outlet section 16. The remaining part, which is represented by the streamlines 26, impinges here onto the diverting surface 11 and, there, is diverted and swirled. However, there are formed fewer vortices 28 than in the case of the elbow 10 from FIG. 2a. The pressure loss in the embodiment from FIG. 2b is thus smaller than in the case of the elbow 10 from FIG. 2a.

The elbow 10 from FIG. 2c comprises three guide elements 30. The three guide elements 30 are in this case arranged between the edge 42 and the diverting surface 11 in such a way that one of the guide elements 30 is arranged between the two other guide elements 30. Between the centrally arranged guide element 30 and the two outer guide elements 30, in each case one guide channel 36 is formed.

Here, one part 32 of the flow of the fluid is diverted from the inlet section 14 into the outlet section 16 between the edge 42 and a guide element 30 arranged closest to the edge 42. The parts 34 and 35 of the flow of the fluid are diverted through the change angle 24 from the inlet section 14 into the outlet section 16 through the two guide channels 36. The remaining part of the flow, which is represented by the streamlines 26, continues to impinge onto the diverting surface 11. However, this part is significantly smaller in size than the sum of the parts 32, 34 and 35 and forms only few vortices 28. Altogether, only very few vortices 28 are formed in this embodiment, with the result that, in comparison with the other two embodiments from FIGS. 2a and 2b, the pressure drop in this embodiment is the smallest.

FIGS. 3a to 3e show an exemplary embodiment of a guide element 30. Here, as per FIG. 3a, the guide element 30 has a connecting section 38 and a section 40 which is similar in shape to an arc. Here, the section 40 similar in shape to an arc covers an angle similar or equal to the change angle 24. Furthermore, the section 40 similar in shape to an arc is arranged in such a way that it diverts a flow from the inlet flow direction 20 into the outlet flow direction 22. The connecting section 38 connects the section 40 similar in shape to an arc to the inner wall 18 of the edge section 12. Here, the connecting section 38 has a different shape than the section 40 similar in shape to an arc.

Figure 3A:
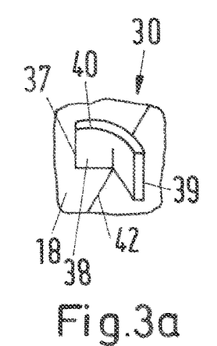
FIGS. 3a-e show schematic cross-sectional illustrations of an example of a guide element.
Figure 3B:
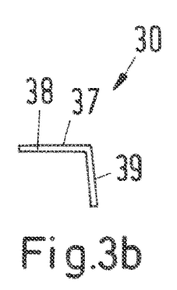

In this exemplary embodiment, as per FIG. 3b, which shows a cross section through the connecting section 38 at the inner wall 18, the connecting section 38 has at the inner wall 18 an angled shape with two leg pieces 37, 39. Here, the leg pieces 37, 39 form legs of an angle whose magnitude corresponds to the change angle 24.

Figure 3C:
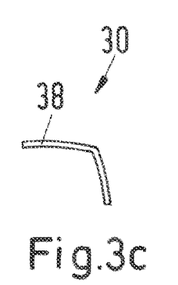
Figure 3D:
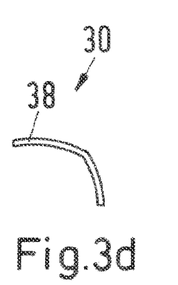
Figure 3E:
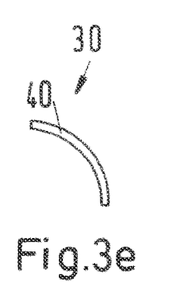

The connecting section 38 transitions into an arcuate shape from the inner wall 18 to the section 40 similar in shape to an arc, this being illustrated by FIGS. 3c and 3d. As per FIG. 3e, the connecting section 38 attains the arcuate shape at the transition to the section 40 similar in shape to an arc.

The guide element 30 is in this case of very thin form at the section 40 similar in shape to an arc. Consequently, the section 40 similar in shape to an arc is at least flexible to such an extent that it can be deformed elastically without damage when a mold core is withdrawn. However, the flexibility of the guide element 30 is not so great that it can be deformed by an air flow. The guide element 30 can thus be produced by means of a mold core within the elbow 10 while the elbow 10 is being produced. Here, the leg pieces 37, 39 of the connecting section 38 are arranged in the direction of the inlet flow direction 20 and of the outlet flow direction 22, wherein the mold core is withdrawn along one of the two directions after the production of the guide element 30 and the elbow 10. A mold core which is withdrawn counter to the inlet flow direction 20 provides a shape for the leg piece 37 in this case. A mold core which is withdrawn in the outlet flow direction 22 provides a shape for the leg piece 39 in this case.

Since the section 40 similar in shape to an arc is formed to be flexible in the aforementioned manner, it can be deformed when the mold core is withdrawn and will not be damaged in this way. Thus, the guide element 30 can be produced in a simple manner by means of a mold core within the elbow 10 during the production of the elbow 10.

Figure 4:
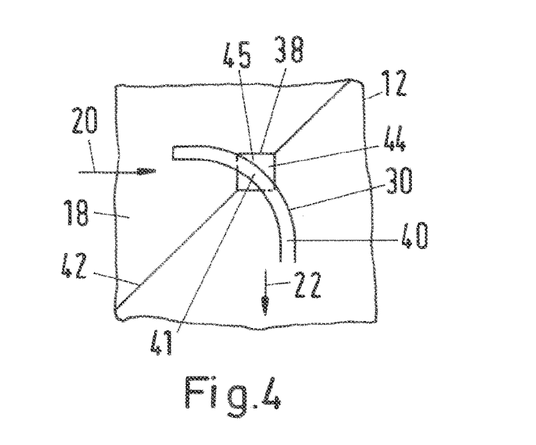
FIG. 4 shows a schematic illustration of a further example of a guide element.

FIG. 4 shows a further embodiment of the guide element 30. Here, the connecting section 38 connects merely a part 41 of the section 40 similar in shape to an arc to the inner wall 18. The connecting section 38 thus extends in the flow direction merely along the part 41 of the section 40 similar in shape to an arc. Furthermore, the connecting section 38 comprises a cross-sectional surface which is formed from two part-surfaces 44, 45. The part-surface 45 is formed here in such a way that it has no undercuts in the inlet flow direction 20. The part-surface 44 is formed in such a way that it has no undercuts in the outlet flow direction 22. Furthermore, in this embodiment too, the section 40 similar in shape to an arc is formed to be flexible according to the description given above.

That part of the connecting section 38 which comprises the part-surface 45 can thus be produced by means of a mold core which is withdrawn from the elbow 10 counter to the inlet flow direction 20. That part of the connecting section 38 which comprises the part-surface 44 can thus be produced by means of a mold core which is withdrawn from the elbow 10 in the outlet flow direction 22. Owing to the flexibility of the section 40 similar in shape to an arc, the section 40 similar in shape to an arc is deformed when the mold cores are withdrawn since the section 40 similar in shape to an arc has an undercut in relation to the mold cores. However, owing to its flexibility, the section 40 similar in shape to an arc is not damaged in this case.

Figure 5:
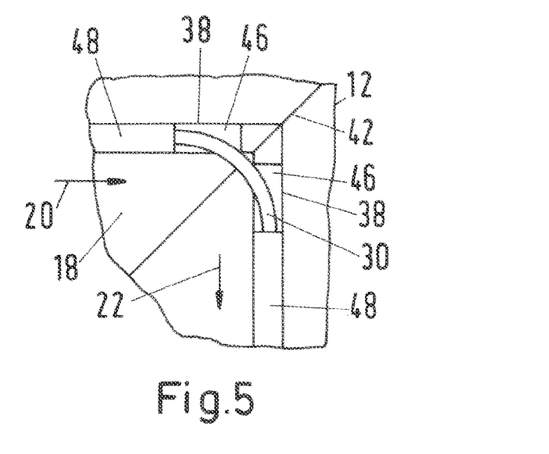
FIG. 5 shows a schematic illustration of a further example of a guide element, FIG. 6a, b show schematic illustrations of a further example of a guide element.

FIG. 5 shows a further embodiment of the guide element 30. In this embodiment, the guide element 30 has been produced separately from the elbow 10. Here, guide grooves 48 are produced or formed in the inner wall 18 of the elbow 10. A guide groove 48 which extends in the direction of the inlet section 14 is in this case oriented along the inlet flow direction 20. A guide groove 48 which extends in the direction of the outlet section 16 is in this case oriented along the outlet flow direction 22.

The guide element 30 has a connecting section 38 which comprises rail elements 46 which can be moved slidingly in a guide groove 48. The rail elements 46 can be fixed in the guide groove 48.

The guide element 30 can thus be introduced into the elbow 10 and connected by means of the rail elements 46 to the guide groove 48. The rail elements 46 can then be moved along the guide groove 48 until the guide element 30 is arranged at the intended position in the channel section 12. The rail elements 46 are then fixed in the guide groove 48.

The separate production of the guide element 30 allows the guide element 30 to be produced from a material which is different in relation to the elbow 10.

Figure 6A:
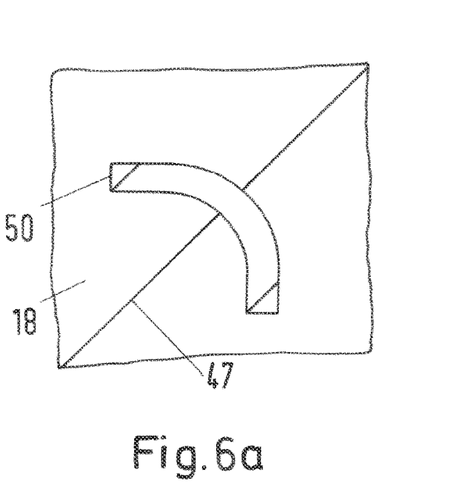

FIGS. 6a and 6b show a further embodiment of the guide element 30. As per FIG. 6a, a lateral aperture 50 is formed in the inner wall 18 of the channel section 12, through which the section 40 similar in shape to an arc of the guide element 30 can be arranged in the channel section 12 from the outside. Here, the connecting section 38 of the guide element 30 can be connected to the lateral aperture 50. In this case, the guide element 30 can be pushed into the aperture 50 and for example be welded or adhesively bonded.

Figure 6B:
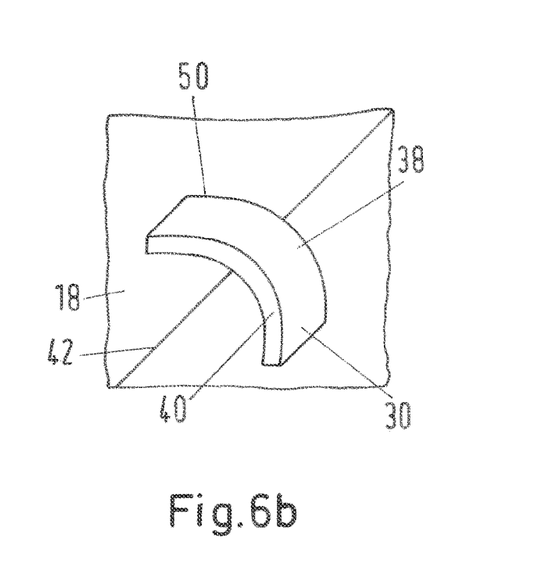

As per FIG. 6b, the connecting section 38 is connected here to the inner wall 18. The connection is realized at the position at which the guide element 30 is intended to be arranged in the elbow 10.

This exemplary embodiment of the guide element 30, too, is produced separately from the elbow 10 and may consist of a material which is different in relation to the elbow 10.

Figure 7:
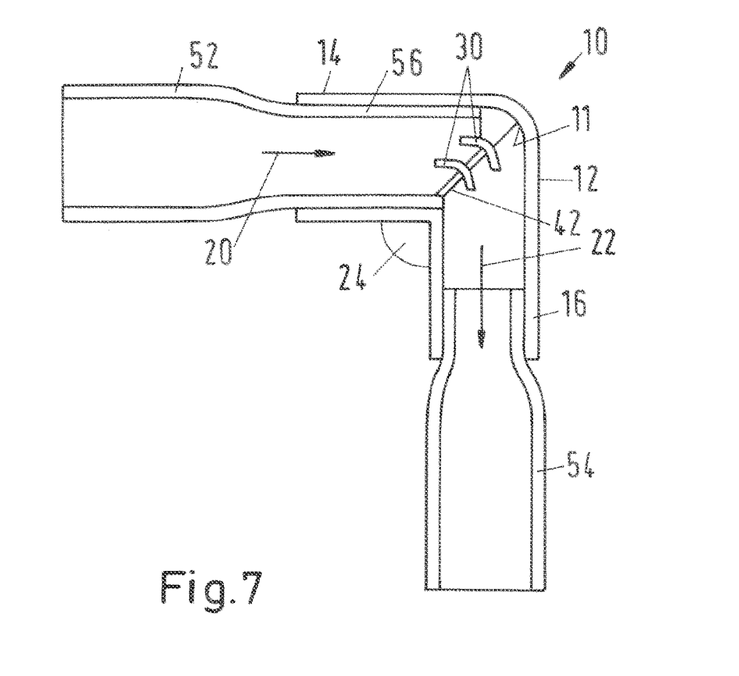
FIG. 7 shows a schematic illustration of a holder of a fluid line with a guide element.

FIG. 7 describes a further embodiment of the guide element 30. Here, the guide element 30 is formed on a holding element 56 of a fluid line 52, which holding element is plugged into the elbow 14. The holding element 56 extends from the inlet section 14 as far as the channel section 12 of the elbow 10. The guide element 30 is arranged on one end of the holding element 56 and is arranged in the channel section 12 by way of the arrangement of the holding element 56 in the elbow 14.

A further fluid line 54 can be inserted at the outlet section 16 of the elbow 12. Alternatively, the guide element 30 can furthermore be arranged on a holding element 56 which is connected via the outlet section 16 to the elbow 12.

Figure 8:
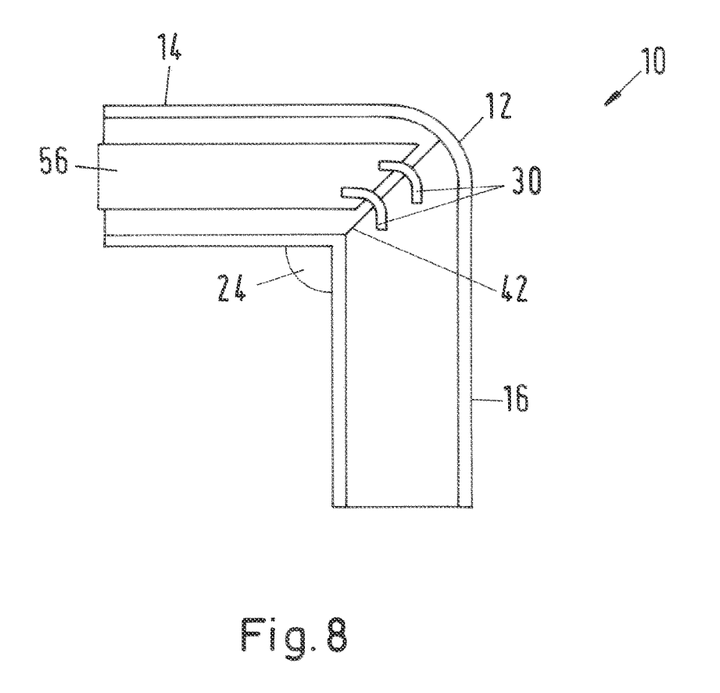
FIG. 8 shows a schematic illustration of a holder of an elbow with a guide element.

FIG. 8 describes a further embodiment of the guide element 30. Here, the guide element 30 is arranged on the elbow 10 by way of a holding element 56. The holding element 56 can be pushed into the elbow 10 in order to arrange the guide elements 30 in the channel section 12.

Here, the holding element 56 can be inserted into the elbow 10 both through the inlet section 14 and through the outlet section 16.

Figure 9:
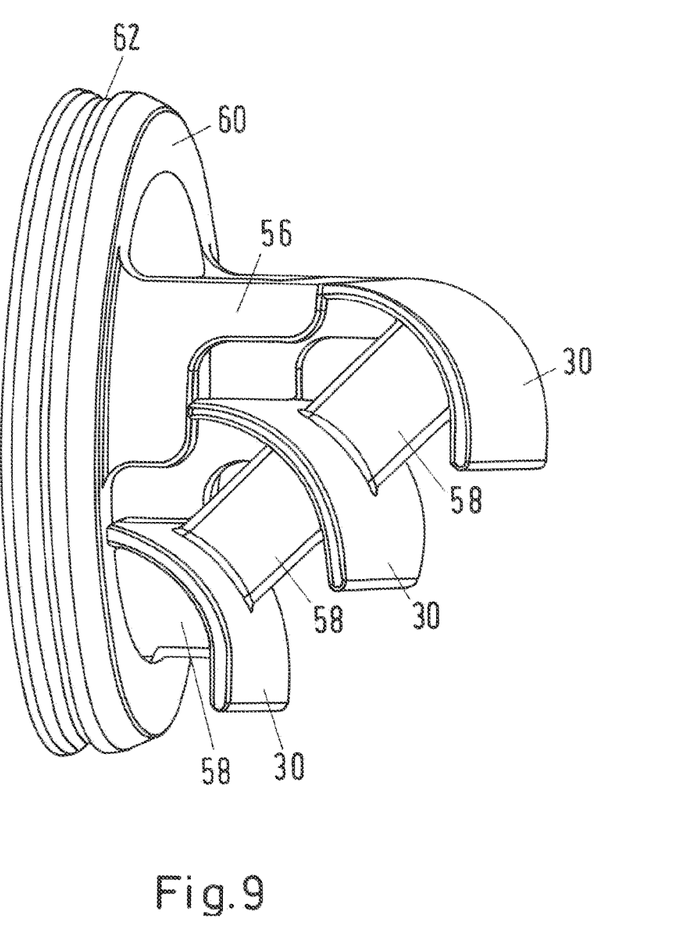
FIG. 9 shows a schematic illustration of guide elements with at least one reinforcement element.

FIG. 9 shows a further example of a holding element 56, which has three guide elements 30 and extends away from a support ring 60. The support ring 60 may be inserted into the elbow 10. For this purpose, the support ring 60 may have for example a groove 62 which can be press-fitted with an undercut at the elbow 10 for fastening. The connection of the support ring 60 may however also be formed in another manner, for example by adhesion, welding, etc.

Alternatively, the reinforcement element 58 may be connected directly to the elbow 10.

In this example, the guide elements 30 are supported by a reinforcement element 58. Here, the reinforcement element 58 can support the guide elements 30 against a wall of the elbow 10 or of the support ring 60. The guide elements 30 are supported by means of the reinforcement element 58 in a direction transverse to their own direction of extent.

However, it is not necessary for the reinforcement element 60 to support the guide elements 30 against the support ring 60 or against the elbow 10. The reinforcement element 60 may also support the guide elements 30 only with respect to one another. This alone brings about an improvement in the stability of the guide elements 30, per at least some embodiments.

The reinforcement element 58 in this case projects into the flowing fluid diverted by the guide elements 30 and can connect the guide elements 30 to one another. Here, contrary to expectations, the reinforcement element 58 brings about a reduction in the pressure loss in the elbow 10 instead of an increase in the pressure loss. Without the reinforcement element 58, the reduction in the pressure loss in an elbow 10 with an angle of 90° can for example be 36% on average. Through the addition of the reinforcement element 58, the reduction can for example be 39% on average.

In this example, the reinforcement element 58 is in the form of a strut which extends along the main direction of the flowing fluid and between the guide elements 30, wherein said reinforcement element connects the guide elements 30. Here, in this example, the reinforcement element 58 is arranged in the plane spanned by the legs of the change angle 24 and extends in this plane with its main directions of extent. Said reinforcement element may however also be arranged so as to intersect said plane.

The invention is not restricted to one of the embodiments described above, but rather may be modified in a variety of ways.

All the features and advantages that emerge from the claims, from the description and from the drawing, including structural details, spatial arrangements and method steps, may be essential to the invention both individually and in a wide variety of combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE SIGNS

10 Elbow
11 Diverting surface
12 Channel section
14 Inlet section
16 Outlet section
18 Inner wall
20 Inlet flow direction
22 Outlet flow direction
24 Change angle
26 Streamlines
28 Vortex
30 Guide element
32 Part of the flow
34 Part of the flow
35 Part of the flow
36 Guide channel
37 Leg piece
38 Connecting section
39 Leg piece
40 Section similar in shape to an arc
41 Part
42 Edge
44 Part-surface
45 Part-surface
46 Rail element
48 Guide groove
50 Lateral aperture
52 Fluid line
54 Fluid line
56 Holding element
58 Reinforcement element
60 Support ring
62 Groove

The invention claimed is:

1. An elbow for a fluid-communicating connection of fluid lines of a vehicle, wherein the elbow has a channel section for changing a flow direction of a fluid by a change angle, wherein an inlet flow direction of the fluid into the elbow and an outlet flow direction of the fluid from the elbow form legs of the change angle, wherein at least one guide element is arranged in the channel section and projects into the channel section, wherein the at least one guide element at least largely changes the flow direction of one part of the fluid adjacent the change angle, wherein the at least one guide element is connected to a support ring, the support ring being inserted into and connected to the elbow, wherein a reinforcement element supports the at least one guide element on the support ring, wherein the reinforcement element extends away from the at least one guide element, wherein the reinforcement element extends in a plane spanned by the legs of the change angle to a wall of the elbow or to a wall of a fluid line in the channel section, and wherein the elbow has multiple guide elements and the reinforcement element connects the multiple guide elements to one another.

2. The elbow as claimed in claim 1, wherein the elbow has an inlet section and an outlet section which are connected in fluid communication by means of the channel section, wherein the channel section has an edge which is arranged between the inlet section and the outlet section.

3. The elbow as claimed in claim 1, wherein the at least one guide element is at least three guide elements, wherein one of the at least three guide elements is arranged between the two other guide elements of the at least three guide elements and, with the two other guide elements of the at least three guide elements, in each case defines a guide channel.

4. The elbow as claimed in claim 1, wherein the change angle is between 45° and 135°.

5. The elbow as claimed in claim 1, wherein the at least one guide element has a section which is similar in shape to an arc and which covers an angle whose magnitude corresponds completely or largely to the change angle.

6. The elbow as claimed in claim 5, wherein the at least one guide element has a connecting section which connects the section similar in shape to an arc to a wall of the channel section, wherein the connecting section has a different shape than the section similar in shape to an arc.

7. The elbow as claimed in claim 6, wherein the connecting section has at an inner wall an angled shape with two leg pieces, wherein in each case one leg piece of the two leg pieces is arranged parallel to one of the legs of the change angle, wherein, with an increasing distance from the inner wall of the channel section, the connecting section transitions into an arcuate shape.

8. The elbow as claimed in claim 6, wherein the connecting section extends in the flow direction along a part of the section similar in shape to an arc and has between the section similar in shape to an arc and the inner wall a cross-sectional surface formed from two part-surfaces, wherein one part-surface of the two part-surfaces is free of an undercut in relation to the inlet flow direction and the other part-surface of the two part-surfaces is free of an undercut in relation to the outlet flow direction.

9. The elbow as claimed in claim 6, wherein the connecting section has a lateral aperture for connecting the at least one guide element to the wall of the channel section.

10. The elbow as claimed in claim 1, wherein the at least one guide element is fastened to a holding element, wherein the holding element is arranged in the elbow in the channel section.

11. The elbow as claimed in claim 10, wherein the holding element is connected to the elbow.

12. The elbow as claimed in claim 10, wherein the holding element is fastened to a fluid line which is connected to the elbow.

13. The elbow as claimed in claim 1, wherein the change angle is between 60° and 110°.

14. The elbow as claimed in claim 1, wherein the change angle is 90°.

15. The elbow as claimed in claim 1, wherein the at least one guide element includes a plurality of guide elements, the plurality of guide elements is connected to the support ring, and the reinforcement element interconnects the plurality of guide elements.

16. An elbow for a fluid-communicating connection of fluid lines of a vehicle, wherein the elbow has a channel section for changing a flow direction of a fluid by a change angle, wherein an inlet flow direction of the fluid into the elbow and an outlet flow direction of the fluid from the elbow form legs of the change angle, wherein at least one guide element is arranged in the channel section and projects into the channel section, wherein the at least one guide element at least largely changes the flow direction of one part of the fluid adjacent the change angle, wherein the at least one guide element has a section which is similar in shape to an arc and which covers an angle whose magnitude corresponds completely or largely to the change angle, wherein the at least one guide element has a connecting section which connects the section similar in shape to an arc to a wall of the channel section, wherein the connecting section has a different shape than the section similar in shape to an arc, and wherein the wall of the channel section has at least one guide groove for rail elements of a connecting section of a guide element, said at least one guide groove extending parallel to one of the legs of the change angle, wherein the connecting section has at least one rail element which can be moved slidingly in the guide groove and can be fixed in the guide groove.

* * * * *